Oct. 27, 1970  J. C. WITTWER  3,535,862
CLEANING ATTACHMENT FOR MOWER
Filed Nov. 26, 1969  6 Sheets-Sheet 1

INVENTOR.
JOHN C. WITTWER
BY
Roy C. Hopgood
ATTORNEY

Oct. 27, 1970  J. C. WITTWER  3,535,862
CLEANING ATTACHMENT FOR MOWER
Filed Nov. 26, 1969  6 Sheets-Sheet 2
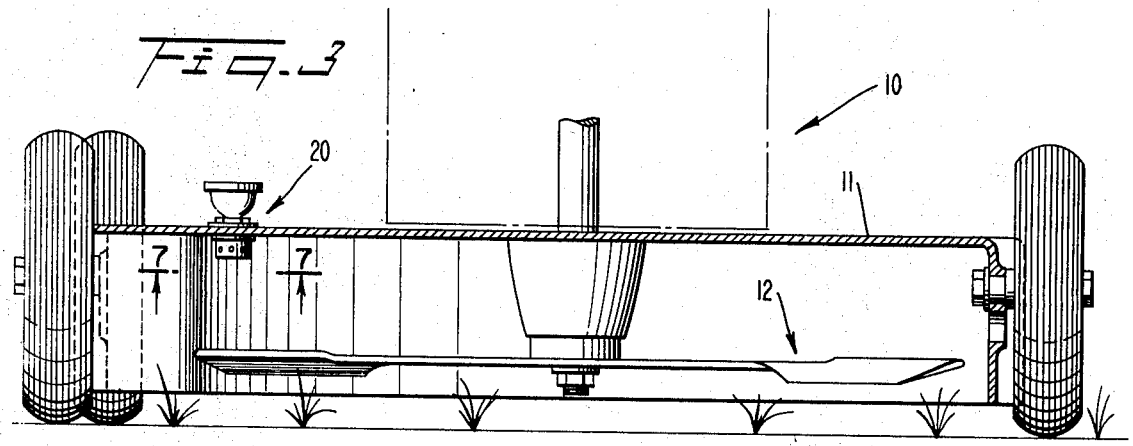
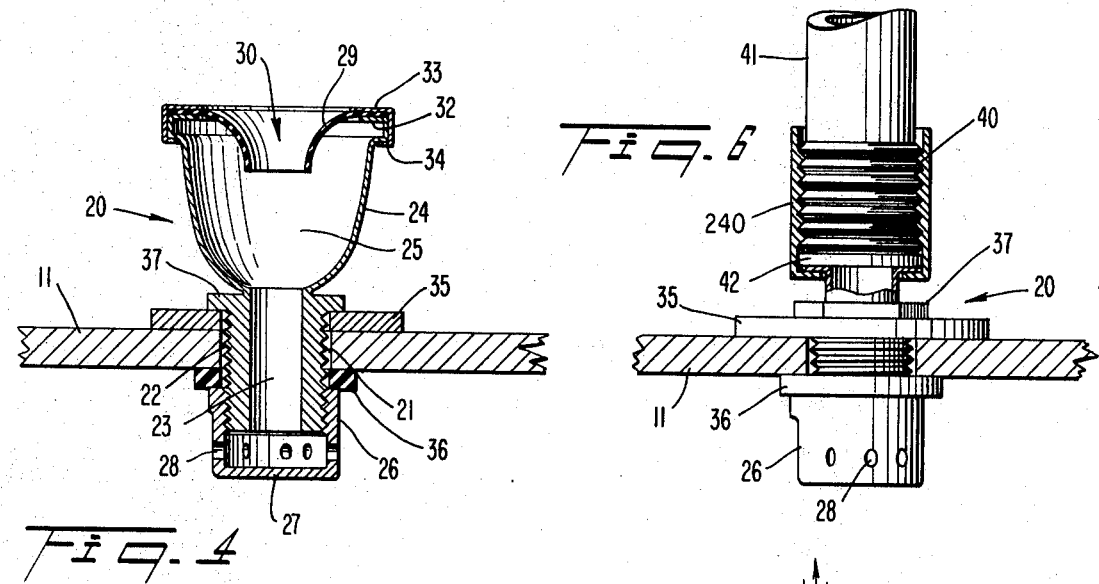
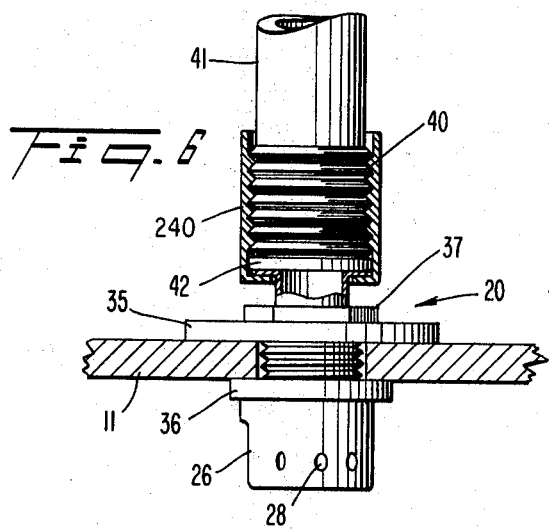
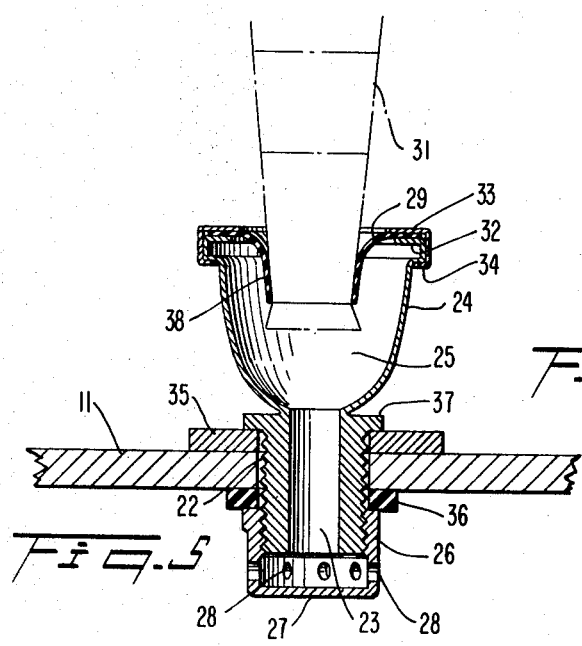
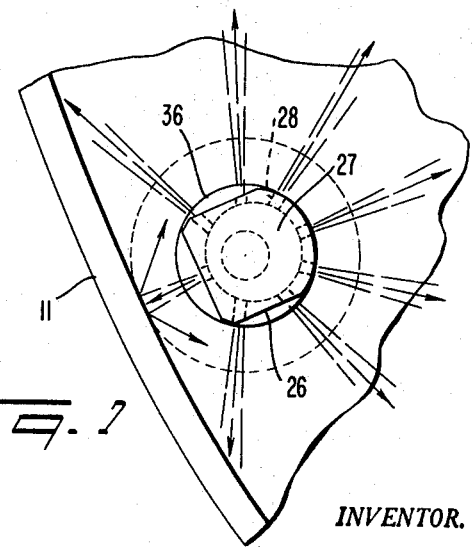
INVENTOR.
JOHN C. WITTWER
BY
Roy C. Hopgood
ATTORNEY

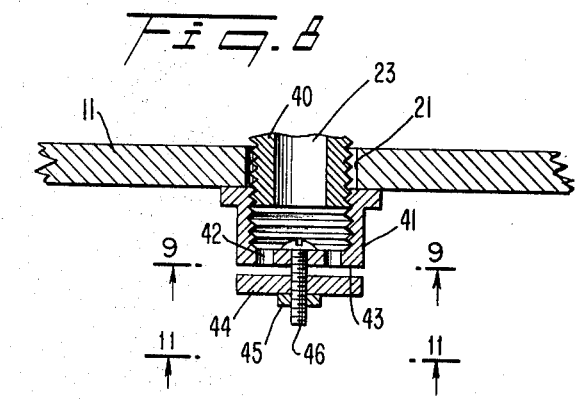
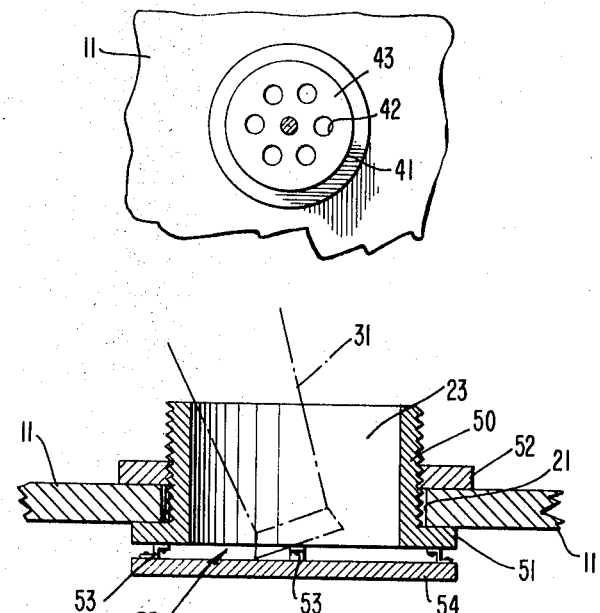
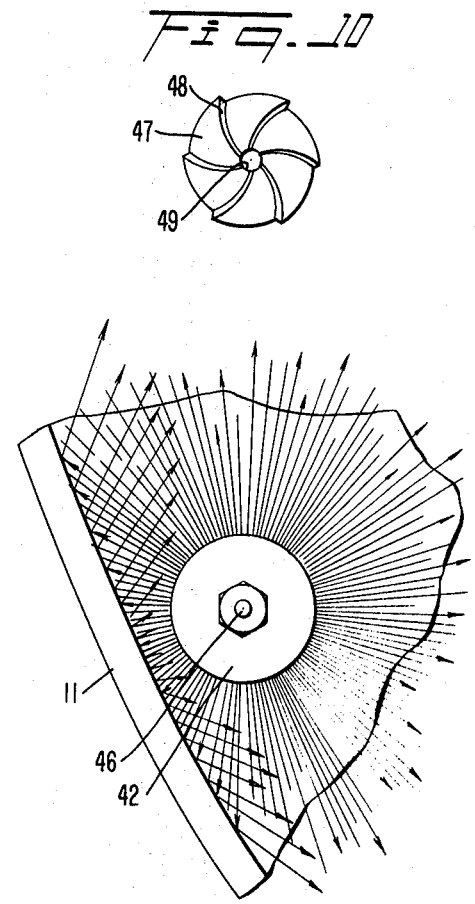
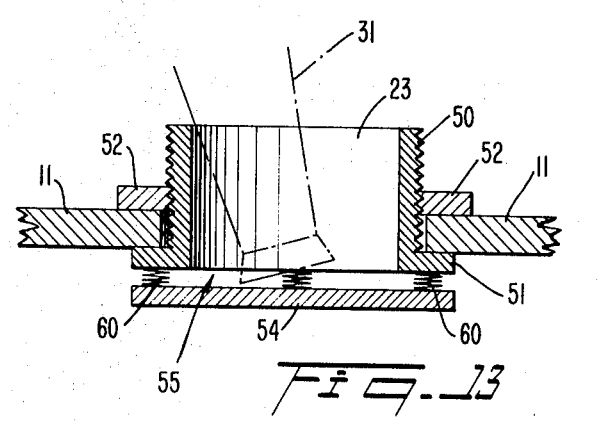

Oct. 27, 1970   J. C. WITTWER   3,535,862
CLEANING ATTACHMENT FOR MOWER
Filed Nov. 26, 1969   6 Sheets-Sheet 4
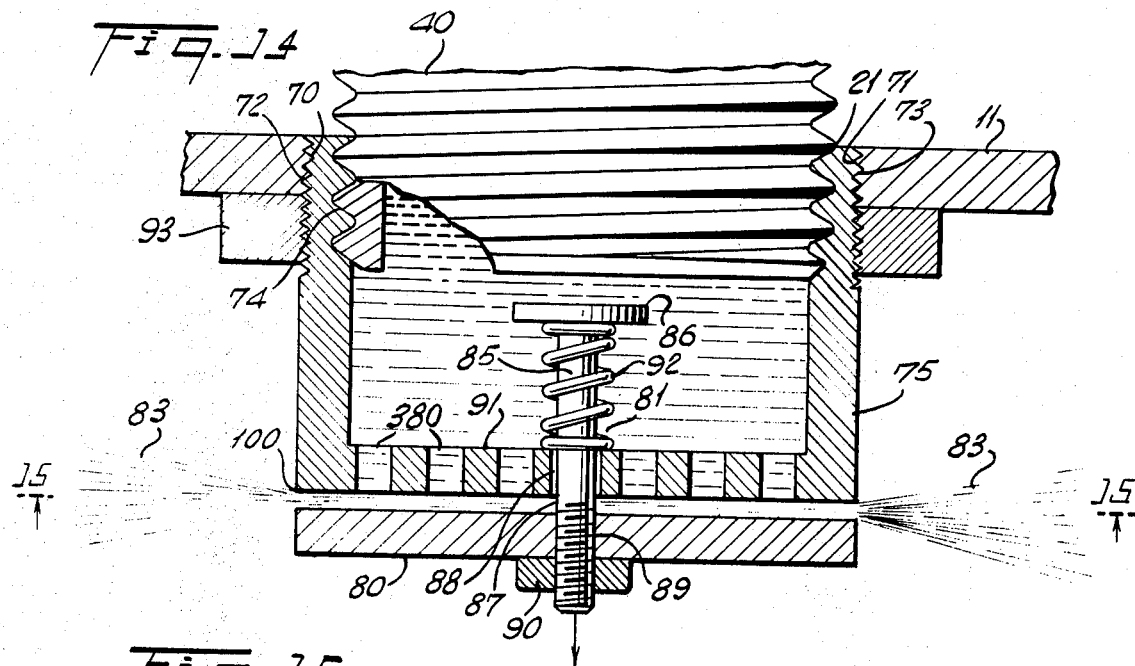
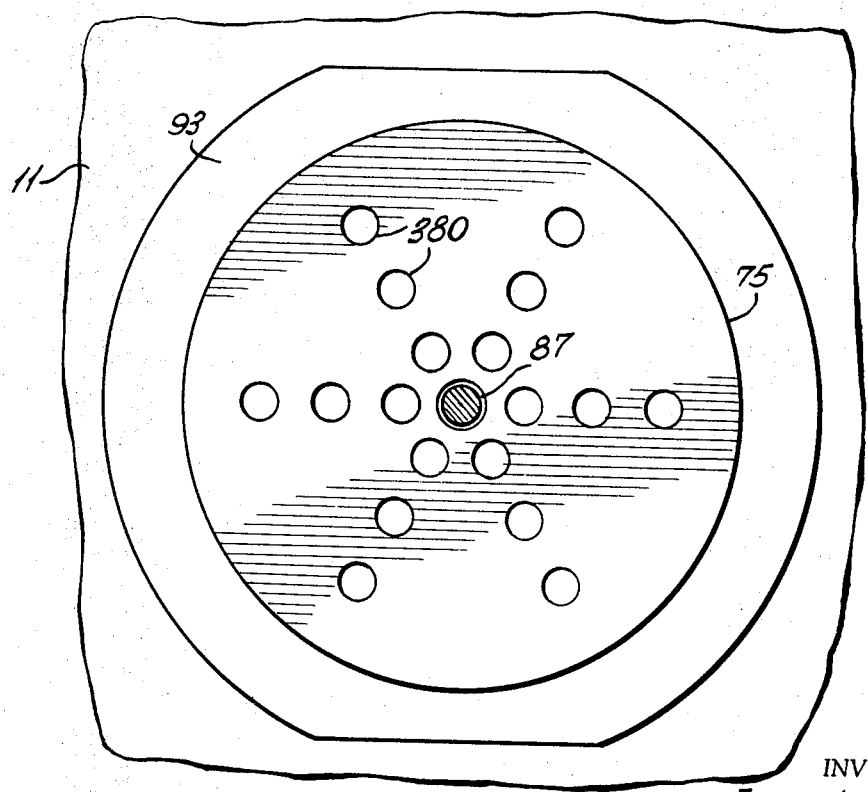
INVENTOR.
JOHN C. WITTNER
BY Hopgood and Calimafde
ATTORNEYS

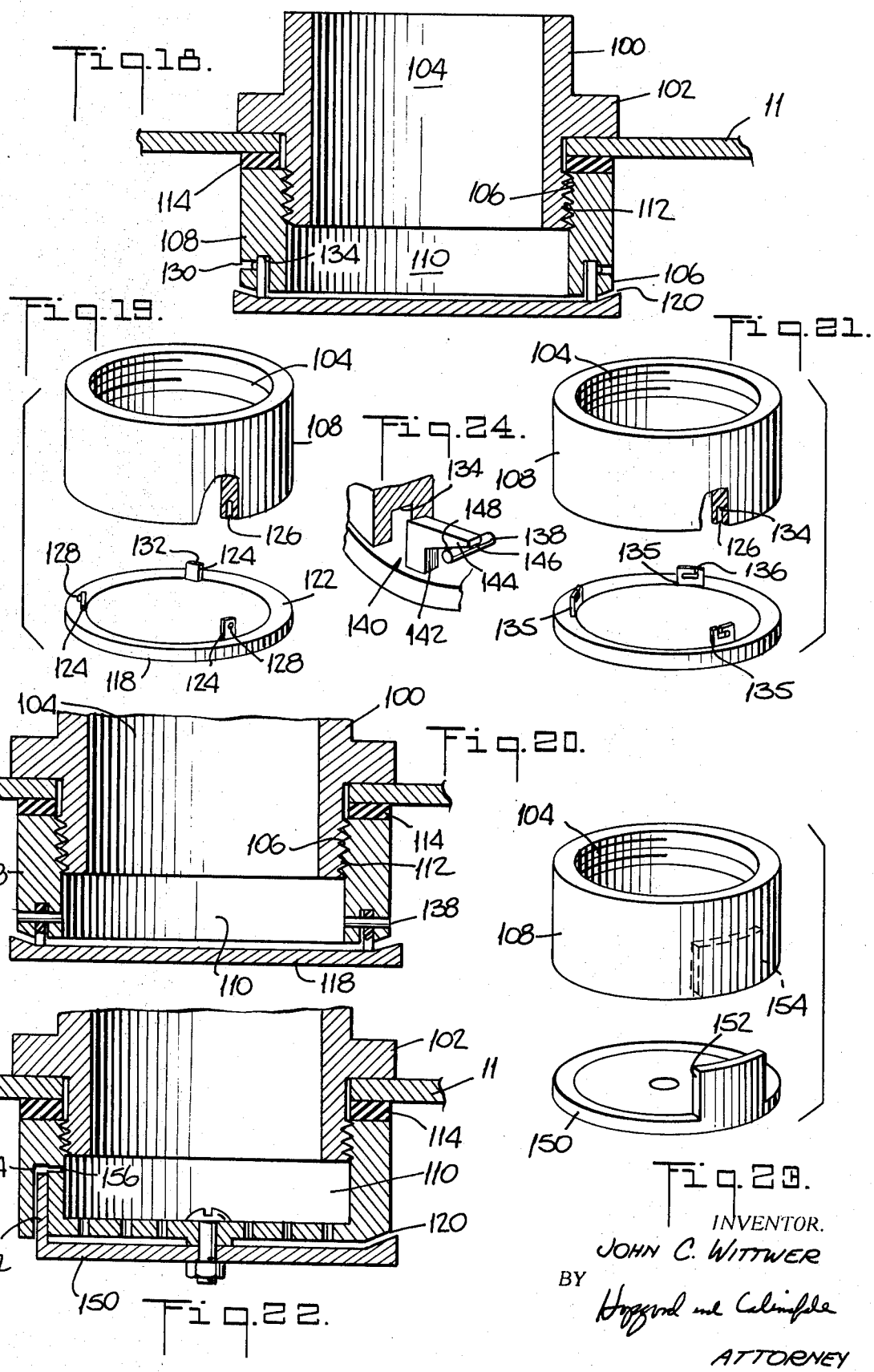

United States Patent Office 3,535,862
Patented Oct. 27, 1970

3,535,862
CLEANING ATTACHMENT FOR MOWER
John C. Wittwer, Mount Kisco, N.Y. (% W-B Chemical Company, Inc., 15 MacQuester Parkway S., Mt. Vernon, N.Y. 10550)
Continuation-in-part of application Ser. No. 802,317, Feb. 6, 1969, which is a continuation-in-part of application Ser. No. 506,423, Oct. 25, 1965, which is a continuation-in-part of application Ser. No. 261,933, Feb. 14, 1963, which in turn is a continuation-in-part of application Ser. No. 60,923, Oct. 6, 1960. This application Nov. 26, 1969, Ser. No. 880,047
Int. Cl. A01d 35/26
U.S. Cl. 56—25.4                                   6 Claims

ABSTRACT OF THE DISCLOSURE

This invention relates to a lawn mower attachment in which water under pressure is sprayed, as a strong jet, against the blades of a lawn mower. The housing of the mower supports a duct which contains a disc at the bottom thereof and which cooperates with a special cap to provide the strong jet effect.

---

This invention generally relates to a cleaning attachment for a lawn mower, and, more particularly to a structural arrangement for a lawn mower to permit cleaning without inverting the lawn mower and is a continuation-in-part of my prior application Ser. No. 802,317, filed Feb. 6, 1969, which is a continuation-in-part of my prior application Ser. No. 506,423, filed on Oct. 25, 1965, which is a continuation-in-part of my prior application, Ser. No. 261,933, filed Feb. 14, 1963, which application is a continuation-in-part of my parent application, Ser. No. 60,923, filed Oct. 6, 1960, all of which are now abandoned.

To clean the rotary type lawn mover having a housing to cover the upper portion of a rotatable cutting blade, it is customary to turn the mower on its side and spray with water from an ordinary garden hose. However, in practice, it has been found that to tilt this type of lawn mower results in flooding the combustion chamber and in seepage of oil, gasoline and the like from the mower which is attached thereto. The loss of even a single drop of oil or gasoline is not only irritating to an economy-minded owner, but a lawn, patio, or driveway which is spotridden from repeated "cleaning" operations is hardly conducive to the continued commercial success enjoyed in the past by this type of mower.

More importantly, a tilting of the rotary type lawn mower exposes the rotatable cutting blade and presents an inherently dangerous situation. Therefore, it is more desirable from a safety viewpoint to be able to clean these mowers without the necessity of tilting them.

Accordingly, it is a principal object of the invention to provide an attachment for a lawn mower to permit ready cleaning of the underside of a housing without the necessity of tilting the mower.

Another object of the invention is to provide a cleaning attachment for a lawn mower to permit the injection of a cleaning fluid beneath a housing which covers the upper portion of a cutting element and to produce a "solid" conical jet of fluid which may be effective for the cleaning operation.

Still another object of the invention is to provide a device for attachment to a housing of a lawn mower to direct a jet of cleaning fluid against substantially the complete underside thereof without the necessity of tilting the mower or to have the motor running.

Briefly, a cleaning attachment in accordance with the invention is secured to the upper portion of a housing which covers the cutting element for a lawn mower and defines a channel to direct a cleaning fluid through the housing. A deflector means is positioned beneath and centrally secured to the housing to produce a jet or stream of cleaning fluid directed laterally beneath the housing for cleaning purposes without the necessity of tilting or inverting the lawn mower and without the necessity of having the motor turned on.

Ather objects and advantages of the invention will be pointed out in the following description and claims and illustrated in the accompanying drawings which disclose, by way of example, the principle of the invention and the best mode which has been contemplated of applying that principle.

In the drawings:

FIG. 3 is an enlarged view in elevation partly in section taken along the line 3—3 in FIG. 2;

FIG. 4 is an enlarged vertical cross sectional view of the invention shown in FIG. 3;

FIG. 5 is an enlarged view in cross section similar to that shown in FIG. 4, but illustrating the insertion of a spout to direct cleaning fluid therein;

FIG. 6 is a sectional modified form of cleaning device in accordance with the invention;

FIG. 7 is a bottom view taken along the line 7—7 in FIG. 3 and illustrating diagrammatically one arrangement for directing cleaning fluid to impinge against the underside of the lawn mower;

FIG. 8 is a sectional view of one modified form of the invention;

FIG. 9 is a view along the line 9—9 in FIG. 8;

FIG. 10 is a plan view of a rotatable impeller for use on the form shown in FIG. 8;

FIG. 11 is a bottom view along the line 11—11 in FIG. 8;

FIG. 12 is a sectional view of a further modified form of the invention which is similar to that shown in FIG. 8;

FIG. 13 is a sectional view of a form of the invention similar to FIG. 12;

FIG. 14 is a sectional view of a further modified form of the invention;

FIG. 15 is a view along the line 15—15 of FIG. 14;

FIG. 18 is a sectional view of an alternate form of the invention;

FIG. 19 is a perspective exploded view of the form of FIG. 18;

FIG. 20 is a sectional view of an alternate form of the invention;

FIG. 21 is a perspective exploded view of the form of FIG. 20;

FIG. 22 is a sectional view of an alternate form of the invention;

FIG. 23 is a perspective exploded view of the form of FIG. 22; and

FIG. 24 is a partial perspective view of an alternate form of the invention.

Figure 1:
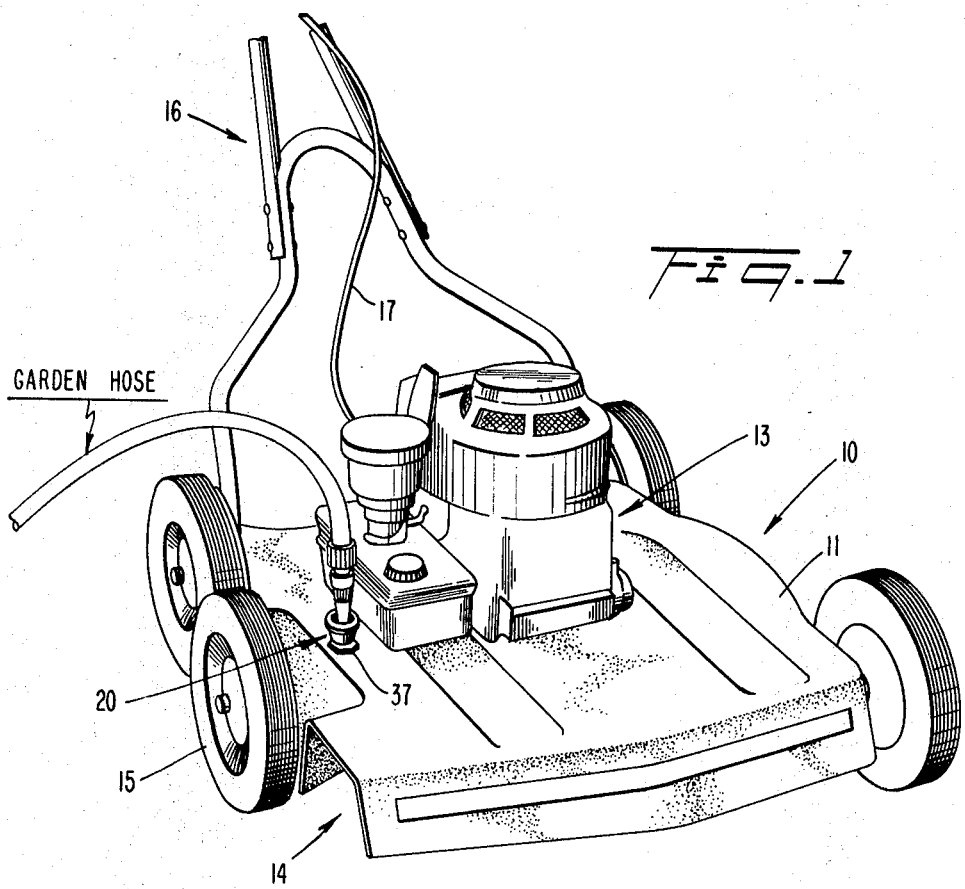
FIG. 1 is a fragmentary perspective view of a rotary type lawn mower with the cleaning device of the invention attached thereto.

Referring now particularly to FIG. 1, the numeral 10 identifies a lawn mower generally, and the numeral 11 identifies a housing fitted over the upper portion of a cutting element or blade 12 (see FIG. 3). A motor 13, FIG. 1, is supported above the housing 11 to supply power for turning the cutting element 12.

While it will be referred to hereinafter as a lawn mower, it will be understood that the mower 10 may be used to cut other than "lawns." An opening 14 is formed in the housing 11 just ahead of the front right wheel 15 to discharge cut grass from the housing 11, although it should be understood that the grass discharge opening may be at another location if desired.

A handle 16 extends from the rear of the mower 10 to assist a person directing its travel, and a suitable control cable 17 is extended from the motor 13 to a position which is convenient for operation of the mower by a person.

Figure 2:
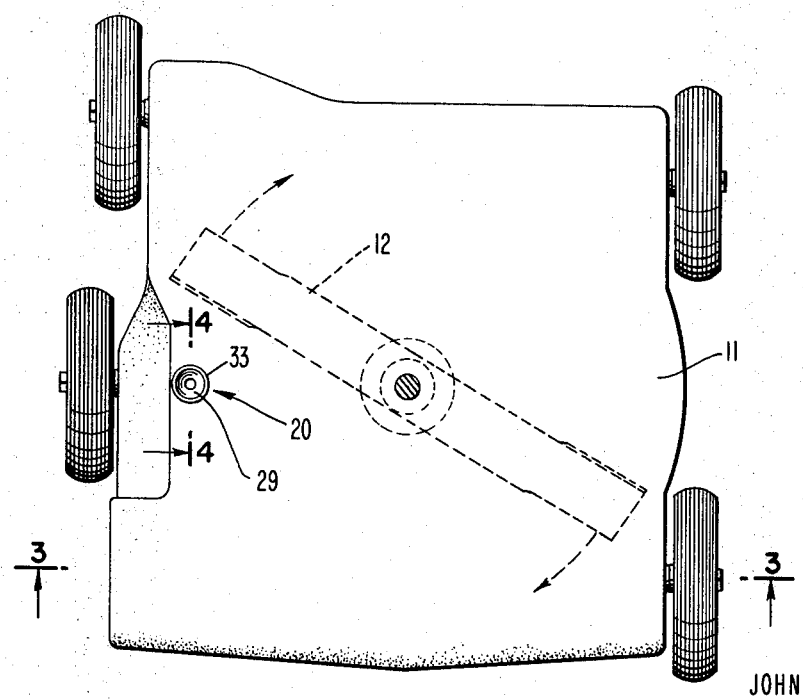
FIG. 2 is a plan, diagrammatic view of the lawn mower shown in FIG. 1, illustrating the relationship between the direction of rotation of a cutting element and the position of the cleaning attachment relative to a grass discharge opening.

In accordance with the invention, a cleaning attachment, indicated generally by the numeral 20, is located on the upper portion of the housing 11 adjacent but in back of the grass discharge opening 14, as viewed in FIG. 2, relative to the direction of rotation of the cutting element 12. A principal purpose for locating the cleaning attachment 20 in this position is to prevent cleaning fluid injected beneath the housing 11 from being hurled promptly out through the opening 14. In other words, by injecting a cleaning fluid into the attachment 20 at the position indicated in FIG. 2 of the drawings, the rapidly rotating cutting element 12 assists in dashing the fluid against the underside of the housing 11 when the motor 13 is left running.

However, it should be understood the motor 13 need not be running for a completely satisfactory cleaning operation. If the motor is running, it provides merely a supplemental benefit of a relatively small magnitude. Therefore, as a practical matter, the cleaning attachment 20 may be located at any position on the upper portion or surface of the housing 11. Since there are some models of the rotary lawn mower on the market today that do not have an opening 14, as such, this in no way detracts from the operation of the invention. It is the force of the cleaning fluid directly laterally from the cleaning attachment itself that does the cleaning.

Referring now to FIG. 4 of the drawings, an opening 21 is formed in the upper surface of the housing 11, and a conduit or channel 22 having a hollow duct 23 extending therethrough is positioned within the opening 21. A receptacle 24 which provides a chamber 25 is formed integrally with the upper end of the conduit 22 so that the duct 23 forms an extension of the chamber 25.

The lower end of the conduit 22 is threaded to receive a cap 26 having a closed end 27 and having a plurality of apertures 28 spaced apart laterally about the circumference of the cap 26. In other words, the plurality of apertures 28 are formed on respective axes which are approximately at right angles to the longitudinal axis of the duct 23.

The chamber 25 is enclosed except for an upper open end in which is positioned a diaphragm 29 having a centrally disposed opening 30 therein. Of course, if desired, the diagram 29 may be provided with a plurality of radially extending slits in place of a positively formed opening 30, a principal purpose of the diaphragm 29 being to provide a sealing means about a spout 31 ( FIG. 5) while a cleaning fluid is being introduced into the chamber 25 and to prevent grass clippings from collecting in the chamber 25.

The diaphragm 29 may be attached across the open end of the chamber 25 in any suitable manner. In FIG. 4 of the drawings it is shown that the upper end of the chamber 25 is provided with a rim 32, and the diaphragm 29 is supported on this rim. A ring 33 in positioned over the diaphragm 29 and is crimped under the edge of the housing 24 as indicated by the numeral 34.

As seen in FIG. 5 of the drawings, the diaphragm 29 is flexible to permit entrance of a spout 31. If desired, the rim 38 about the opening 30 in the diaphragm 29 may be provided with an enlarged bead to prevent the diaphragm 29 from being turned inside out when the spout 31 is being withdrawn. Such a bead would permit the spout 31 to slide easily over the rim 38.

It is contemplated that the above referred to spout 31 will be the nozzle of an ordinary garden hose. However, there may be instances when other fluid than water may be desired to be used, such as for example, a rust inhibitor may be conducted directly to the chamber 25 from a can or other container having a spout and by this means the inside of the housing 11 could receive a coating of rust inhibitor fluid.

Alternatively, a cleaning fluid having a chemical action stronger than plain water may be desired and this may be conducted directly to the chamber 25 from any suitable container, preferably a container having a spout. Whatever particular fluid characteristics are desired, it is contemplated that the fluid is injected into the chamber 25 under pressure, preferably a pressure of at least 25 pounds per square inch.

Referring now to FIG. 6 of the drawings, the receptacle 240 may be substantially cylindrical and provided with a plurality of threads 40 on the inner surface thereof to receive the threaded end of a hose 41. Such a hose 41 would be threaded against a resilient washer 42 in a manner similar to that when the threaded end of such a hose 41 is attached to an ordinary garden nozzle. The remainder of the device 20 shown in FIG. 6 is substantially the same as that described previously above.

To attach the device 20 to the housing 11 of a lawn mower, an opening 21 is formed first in the upper surface of the housing 11 as described previously and as shown particularly in FIG. 2. Then, the conduit 22 is inserted within the opening 21 over a relatively hard, metallic washer 35 which supplements the strength of the housing 11 about the opening 21. A washer 36 of resilient material such as rubber, leather, plastic and the like is inserted over the lower end of the conduit 22, and the cap 26 is threaded to draw a shoulder 37 against the washer 35 firmly. The shoulder 37, preferably, is square or hexagonal to permit it being held by a suitable wrench while the cap 26 is tightened.

In operation, it is desired to clean out cut grass which is deposited against the surface on the underside of the housing 11 of a rotary type lawn mower. Since it is undesirable to tilt such a lawn mower and to lose oil and gas from the motor attached thereto and to expose a safety hazard, the device 20 is provided to perform the desired cleaning action. An ordinary garden hose is used, the nozzle of which is inserted into the chamber 25 by merely a pushing action, or alternatively, the threaded end of the hose may be threaded to the chamber with the form of the invention as shown in FIG. 6.

With the motor 13 either on or off, the water supply is turned on and, preferably, is supplied at a pressure in excess of 25 p.s.i. The water injected into the chamber 25 passes through the duct 23 and out through the plurality of apertures 28 to impinge against the under surface of the housing 11 as illustrated diagrammatically in FIG. 7 of the drawings. Such a cleaning action requires only a few minutes to completely clean the underside of the housing 11 under usual conditions.

In the form of the invention shown in FIG. 8, a threaded nipple 40 is inserted through the opening 21 in the upper surface of the housing 11. The top of the nipple 40 has been omitted in FIG. 8 since it may be formed either as seen in FIG. 4 or as seen in FIG. 6, as desired.

A cap 41 is threaded onto the nipple 40 and tightened against the underside of the housing 11. The cleaning fluid which is conducted through the duct 23 passes through a plurality of circularly arrayed apertures 42 in the end 43 of the cap 41 and is intercepted then by a disc 44 supported by a nut 45 and a bolt 46 directly beneath the apertures 42.

The disc 44 directs the cleaning fluid laterally to impinge on the under surface of the housing 11 for cleaning. The laterally directed fluid is in the form of a circular-shaped fan, FIG. 11, and the velocity and quantity of fluid in the fan may be adjusted from the top by inserting a screw driver through the duct 23 to turn the nut 45 to move the disc 44 relative to the apertures 42. The bolt 46 is threaded in the end 43, so that turning the bolt 46 moves the disc 44 vertically. Of course, other means may be used to prevent rotation of the disc 44, and then, the end 43 need not be threaded.

If desired, the substantially flat, circular disc 44 may be replaced with an impeller disc 47, FIG. 10, with arcuately formed vanes 48 extending outwardly from a central opening 49. The opening 49 is relatively smooth and only slightly larger than the diameter of the bolt 46 so that the disc 47 may turn freely.

A still further form in which the inventive concept may be embodied is illustrated in FIG. 12. A threaded plug 50 is inserted into the opening 21 from the underside of the housing 11 until a circumferentially extending flange 51 bears against the inside surface of the housing 11. A nut 52 is tightened onto the plug 50 from the outside of the housing 11 to lock the plug 50 firmly within the opening 21.

Fixedly mounted by angle members 53 is a plate or disc 54 positioned just beneath the lower opening of the duct 23 to define an annular opening 55 of preselected dimensions. The cleaning fluid is injected into the attachment as seen in FIG. 12 by placing the nozzle 31 of a garden hose directly into the duct 23.

By supporting the disc 54 resiliently as with springs 60 (FIG. 13), the velocity of a fluid may be maintained substantially constant over a range of varying fluid pressure. The springs 60 support the disc 54 normally close to the flange 51, but the disc 54 will be moved downwardly under pressure of a fluid. The amount of downward movement, therefore, will be dependent upon the magnitude of the fluid pressure.

In the embodiment of FIG. 14, water from a hose flows through the opening 21 in the upper surface of the housing 11 through a nipple or nozzle 40. The walls of opening 21 are threaded as at 70 and 71 to receive corresponding threadings 72 and 73 of a cap 75 which may be similar in shape to cap 41. The upper internal walls of cap 75 may have threading or other securing structure 74 to retain nipple 40 in place as the water flows therethrough. Thus the channel means of FIG. 14 includes the cap 75, the upper portion of which is threaded at 70 to fit into housing 11. At the upper end, fluid is received from nozzle 40.

A plurality of vertically aligned apertures 380 are formed in the bottom surface of the cap and direct the flow of water against disc 80. Disc 80 is substantially flat and is secured to cap 75 centrally thereof by the resilient attaching means 81.

The distance between the upper surface of disc 80 and the lowermost surface of cap 75 is adjustably varied, depending upon fluid pressure and the resilient nature of means 81 to provide an effective nozzle 100 to insure that a solid jet or fan of water is emitted with sufficient force to effect cleaning. Essentially, the openings 38 provide a nozzle effect so that the water from the hose passes through two nozzles, 380 and 100.

Resilient securing means 81 comprises a bolt 85 having a head 86 and a shank 87. Cap 75 and disc 80 have central apertures 88 and 89 respectively through which the shank passes. A nut 90 is fastened at the end of the shank. Another nut 93 serves to secure the threadings 70 and 71 to the frame 11.

Between head 86 and the inner transverse surface 91 of the cap is positioned a variable compression spring 92. Spring 92 may have a variable range operating between 20–60 pounds of pressure. The degree of spring compression therefore determine the width of the effective nozzle opening 100. The variation of nozzle opening with water pressure provides a sheet or jet of water of more constant dimensions and makes it possible to avoid dribblings of water which have no cleansing strength. Further, since the disc 80 is centrally secured to cap 75, the nozzle 100 is circumferentially continuous and there are no circumferential barriers to detract from the strength of the jet.

If desired, disc 80 may be replaced with the impeller disc shown in FIG. 10.

Figure 16:
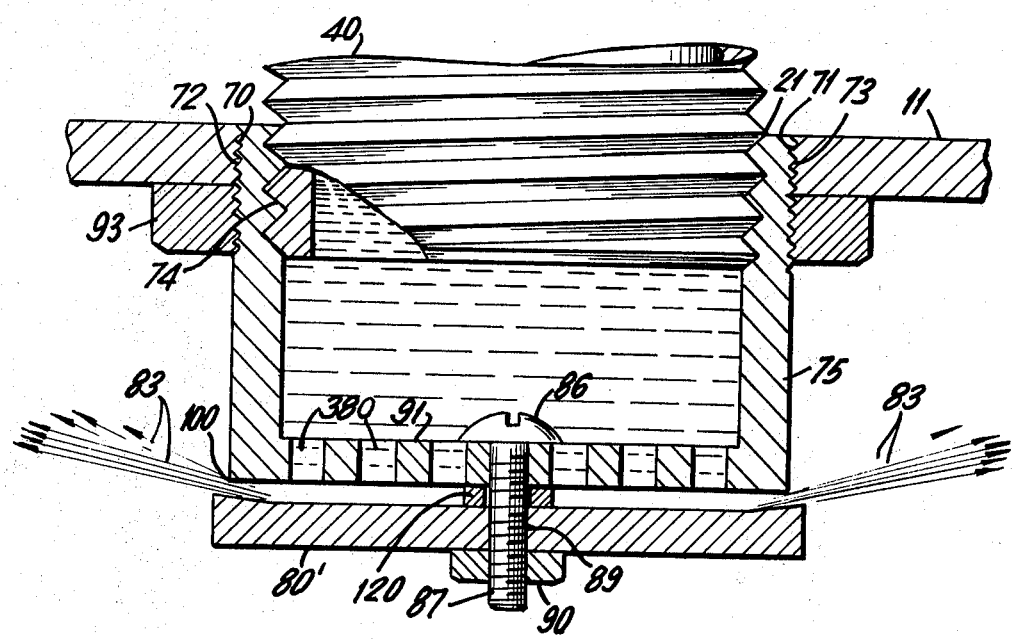
FIG. 16 is a sectional view of the preferred embodiment of my invention.

In the preferred embodiment of FIG. 16, there is disclosed a cap 75 having a plurality of apertures 78 in the bottom surface. A disc 80' has a diameter which is slightly greater than the diameter of the bottom of the cap. The outer section of the disc which essentially faces the circular edge of the bottom surface of the cap has a slight rise which effectively narrows the orifice defined between the upwardly directed surface of the disc and the bottom peripheral surface of the cap and directs the jet of fluid in an upward direction.

In order to obtain the jet effect rather than a slight spray or sprinkle, disc 80' is positioned at a predetermined minimum spacing. A spacer 120 is provided. If the water pressure is 20 pounds per square inch, the spacing should be not less than $\frac{1}{16}$ of an inch, in order to avoid the spray or sprinkle, whereas if the water pressure is 40 pounds per square inch, which is conventional water pressure, to my understanding, then the minimum spacing should be $\frac{1}{8}$ of an inch. Slight tolerances in the nature of $\frac{1}{32}$ of an inch are permissible. Thus, for example $\frac{1}{2}$" pipe or hose is used and the disc is spaced $\frac{1}{8}$ of an inch from the bottom of the cap and the water pressure is 40 pounds per square inch, the jet effect will be satisfactory.

Figure 17:
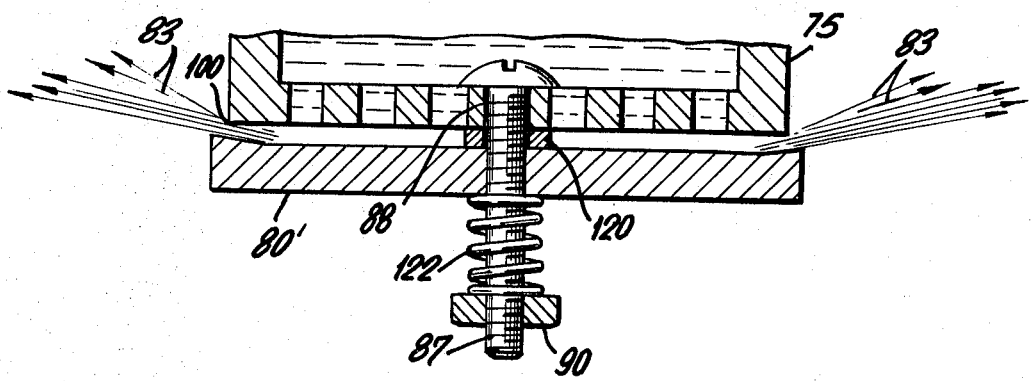
FIG. 17 is a diagram of an alternate embodiment of FIG. 16.

The embodiment of FIG. 17 is similar to that of FIG. 16 since spacer 120 provides the space apart distance. A spring 122 is placed on the shank on the screw between washer 90 and the under-surface of disc 80'. Thus, if the water pressure increases the orifice may be opened accordingly, but in no event will the orifice opening be so small so that only a spray results.

The invention may be embodied in other specific forms without departing from the essential characteristics thereof. For example, the apertures 380 may be formed at slightly upwardly extending axes and be various sizes, depending upon the results which are desired.

With reference to the embodiment shown in FIGS. 18 and 19 a water inlet duct 100 is shown with an annular flange 102 which seats on the mower casing 11. The water inlet duct 100 has a centrally located through bore 104 which at the bottom end is provided with an external screw thread 106 for engagement with a cap 108. The cap 108 is a cylindrical body having a bore 110 extending therethrough to form a continuous water passage with the bore 104 of the water inlet duct. The cap 108 is provided with a screw thread 112 at its upper end for engagement with the water inlet duct. A flexible water sealing washer 114 is provided to avoid water leakage along the screw threads 106–112.

The cap has a bottom end 116 which cooperates with a disc 118 to form an annular nozzle 120. Through this nozzle 120 water may be sprayed slightly upwardly by use of an annular ramp 122 located on a peripheral edge of the disc 118 as shown in FIG. 17. The disc of FIG. 17 is axially adjustable to optimize the size of the annular nozzle. The embodiment shown in FIGS. 18 through 21 illustrate different mountings of the disc to caps wherein the size of the nozzle is automatically determined.

The mounting of the disc 118 is accomplished by providing the disc 118 with three angularly distributed posts 124 which axially protrude from a surface of the disc on which the ramp 122 is also located. The posts 124 are arranged along a common circular line and fit within an annular slot 126 formed in the bottom end 116 of the cap 108. At the top end of each of the posts 124 a male protrusion 128 is provided.

The entire disc 118 and posts 124 may be simply made from plastic by an injection mold process. The slot 126 in the cap 108 is provided with three radially extending recesses 130. The recesses 130 are angularly located in correspondence with the angular location of the protrusions on the posts 124. The recesses 130 further may be either located at the radially inner or outer side of the slot 126 but preferably are formed on the latter side. The recesses 130 may be bores formed by drilling radially inwardly of the cap 108. The disc 118 by use of the posts 128 may thus be conveniently snap fitted to the cap 108 by simply inserting the posts into the slot 126 with slight bending of the posts 124 to allow for the protrusions 128. Upon the bottoming of the top 132 of the posts 124 onto the bottom 134 of the slot 126 a rotational movement assures the precise locating of the protrusions 128 opposite the bore like recesses 130. Note that the radially outer side of the posts fits closest to the radially outer side of the slot to obtain bending space for the protrusions.

The embodiment of FIGS. 20 and 21 include a similar construction to that of FIGS. 18 and 19. However, the disc 118 is now provided with three posts 135 shaped with an angled slot 136 in each. The slot 136 commences at the top of the posts and then forms an angle in a circumferential direction. The angled slots 136 are sized to snugly enclose a dowel 138. Such a dowel 138 is located in the cap slot 126 at angular locations corresponding with the locations of the top openings of the angular post slots 136. The dowels 138 are placed at suitable axial locations of the cap slots 126 so that the mounting of the disc 118 establishes an annular nozzle 120 of the desired size.

Alternatively the slotted posts of FIG. 21 may be replaced with an angled post 140 of FIG. 24. This post 140 consists of an upright section 142 and a circumferentially oriented angled section 144. The latter section has its lower surface 146 tapered as shown so that a clockwise rotational force wedges the tapered circumferential section 144 between the dowel 138 and the bottom 134 of the slot. Three posts such as shown in FIG. 24 are preferably used to mount the disc 118 to the cap 108. Note that the nozzle size may be established by controlling the height of the post. The wedging action between the dowel 138 and the post 140 may cause a deformation of the post surface at 148, but with the post 140 sufficiently large this does not affect the height of the post.

FIG. 22 illustrates a disc 150 generally as shown in FIG. 17. The disc 150 is provided with an upright stop 152 sized to fit within a recess 154 of the cap. The recess 154 is in communication with the cap bore 110 through a radial bore 156. The latter bore 156 provides a passage for water to keep the recess 154 clear of debris. The stop 152 assures a fixed angular position of the disc 150. Some of the several caps and discs shown in the figures such as 18 through 24 may be somewhat difficult to manufacture from metal. However, they may all be conveniently made of plastic by an injection molding process.

Hence, the present embodiments are to be considered in all respects merely illustrative and not as being restrictive, the scope of the invention being indicated by the appended claims rather than by the foregoing description, and all modifications and variations as fall within the meaning and purview and range of equivalency of the appended claims are intended to be embodied therein.

I claim:
1. A cleaning attachment for attaching to a source of water pressure for a lawn mower having a housing about a cutting element comprising:
   means to define a hollow duct through the upper surface of said housing above said cutting element,
   cap means attached to said duct defining means on the underside of said housing,
   said cap means having a plurality of apertures in the bottom thereof having axes substantially parallel with the axis of said duct defining means, whereby a first nozzle effect results,
   disc means positioned under said plurality of apertures to direct a cleaning fluid laterally against the underside of said housing,
   supporting means to support said disc means relative to said plurality of apertures at a predetermined distance apart depending on water pressure to develop a jet of fluid,
   said disc means and said cap means defining a substantially circumferentially continuous nozzle opening,
   the diameter of said disc being slightly greater than the diameter of the bottom of the cap and having an upwardly directed peripheral edge means to define with the bottom peripheral surface of said cap an orifice having an upwardly slanted axis.

2. The device as recited in claim 1 wherein said cap means is provided with a slot facing said disc means, and wherein said disc means includes an upright stop sized to fit within said cap means slot to prevent angular rotation of the disc means.

3. A cleaning attachment for attaching to a source of water under pressure for use with a lawn mower having a housing about a cutting element comprising:
   means to define a hollow water duct through the upper surface of said housing,
   a cap attached to said duct defining means on the underside of said housing, said cap having a bore extending therethrough for conducting water from said hollow water duct to the bottom end of the cap,
   a disc mounted to the cap at the bottom end thereof to form a peripheral nozzle therewith, said disc having on a surface an upwardly directed peripheral ramp edge to form an upwardly slanted flow of water from the peripheral nozzle,
   said cap having a slot formed in the bottom end of the cap and facing said disc and wherein said disc is provided with a post projecting upwardly from the disc surface with the peripheral ramp edge,
   said post being fixedly mounted within the cap slot to form said peripheral nozzle with a preselected width.

4. The device as recited in claim 3 wherein said post is provided at the top end thereof with radially outward protrusion and wherein said cap slot is provided on its radially outward side with a recess, said post protrusion and recess being sized and located for a snap fitting with one another.

5. The device as recited in claim 3 wherein said cap slot is provided with a dowel radially extending therethrough, and wherein said angled post is provided with an angled slot commencing at the top of the post and angling in a circumferential direction, said post being sized to fit within the cap slot with said dowel extending through the angled circumferential portion of the post slot.

6. The device as recited in claim 3 wherein said cap slot is provided with a dowel extending radially therethrough and where the post is angularly shaped, with an upper post portion generally extending in a circumferential direction and sized to fit in wedging relationship between the dowel and the bottom of the cap slot to firmly mount the disc to the cap.

References Cited
UNITED STATES PATENTS

| | | | |
|---|---|---|---|
| 945,867 | 1/1910 | Richter | 239—506 XR |
| 949,360 | 2/1910 | Kinealy | 239—514 XR |
| 1,933,428 | 10/1933 | Harry | 239—515 |
| 2,936,563 | 5/1960 | Blume | 56—25.4 |
| 2,992,524 | 7/1961 | Stabnau | 56—25.4 |

RUSSELL R. KINSEY, Primary Examiner

U.S. Cl. X.R.

239—514